United States Patent
Odendall

(10) Patent No.: US 8,250,912 B2
(45) Date of Patent: Aug. 28, 2012

(54) METHOD FOR CHECKING A CATALYTIC CONVERTER OXYGEN STORAGE RESERVOIR FOR SUFFICIENT STORAGE CAPACITY

(75) Inventor: Bodo Odendall, Lenting (DE)

(73) Assignee: Audi, AG, Ingolstadt (DE)

( * ) Notice: Subject to any disclaimer, the term of this patent is extended or adjusted under 35 U.S.C. 154(b) by 422 days.

(21) Appl. No.: 12/556,752

(22) Filed: Sep. 10, 2009

(65) Prior Publication Data

US 2011/0056279 A1    Mar. 10, 2011

(51) Int. Cl.
*G01M 15/10* (2006.01)
(52) U.S. Cl. .................................. 73/114.73; 73/114.75
(58) Field of Classification Search ............... 73/114.69, 73/114.71, 114.72, 114.73, 114.75
See application file for complete search history.

(56) References Cited

U.S. PATENT DOCUMENTS

| | | | | |
|---|---|---|---|---|
| 5,335,538 | A * | 8/1994 | Blischke et al. | ............ 73/114.75 |
| 7,418,853 | B2 * | 9/2008 | Odendall | ........................ 73/1.06 |
| 7,926,333 | B2 * | 4/2011 | Odendall | ................... 73/114.75 |
| 8,011,173 | B2 * | 9/2011 | Odendall | ........................ 60/276 |
| 2002/0120386 | A1 * | 8/2002 | Shi et al. | ........................ 701/114 |
| 2003/0097873 | A1 * | 5/2003 | Surnilla | ........................ 73/118.1 |
| 2008/0148804 | A1 * | 6/2008 | Yezerets et al. | ................. 73/1.01 |
| 2009/0235726 | A1 * | 9/2009 | Odendall | ................... 73/114.75 |
| 2011/0138876 | A1 * | 6/2011 | Arlt et al. | ..................... 73/23.31 |

FOREIGN PATENT DOCUMENTS

EP    1437501 A1    7/2004

* cited by examiner

*Primary Examiner* — Eric S McCall
(74) *Attorney, Agent, or Firm* — Novak Druce + Quigg LLP

(57) ABSTRACT

Four cases are to be distinguished from one another for an exhaust gas line of a motor vehicle with an oxygen storage reservoir and a lambda probe located downstream from at least part of the oxygen storage reservoir, specifically in each case, whether or not the oxygen storage reservoir has sufficient storage capacity and whether or not the lambda probe is fully serviceable. For this purpose, the exhaust gas line is supplied in an alternating sequence with rich and lean exhaust gas, in two different passes the degree of oxygen filling being varied differently. For a minor variation of the degree of oxygen filling, the serviceability of the lambda probe can be deduced on the basis of certain criteria. If the lambda probe is fully serviceable, the sufficiency or insufficiency of the oxygen storage capacity of the oxygen storage reservoir can be deduced for a greater variation of the degree of oxygen filling.

8 Claims, 3 Drawing Sheets

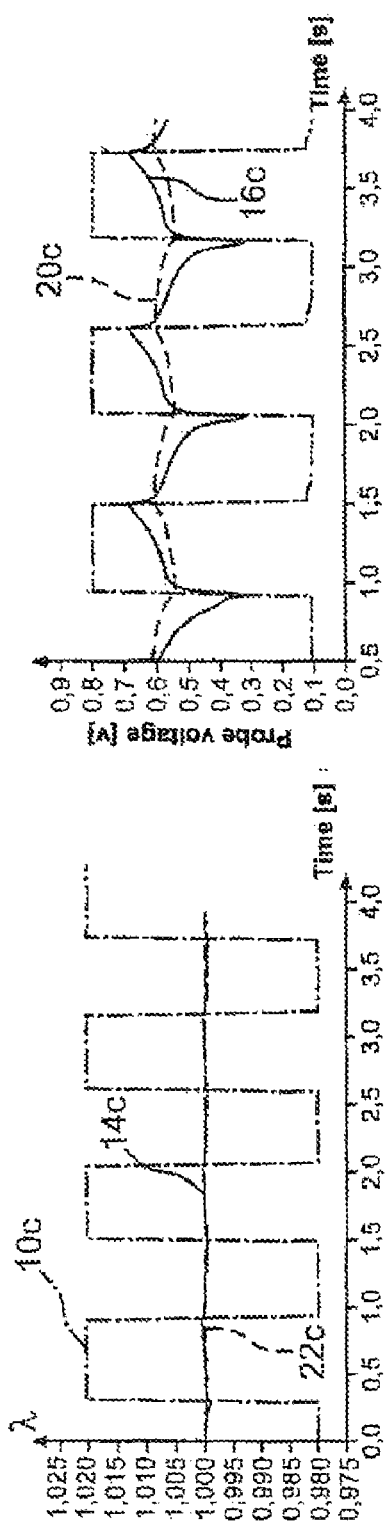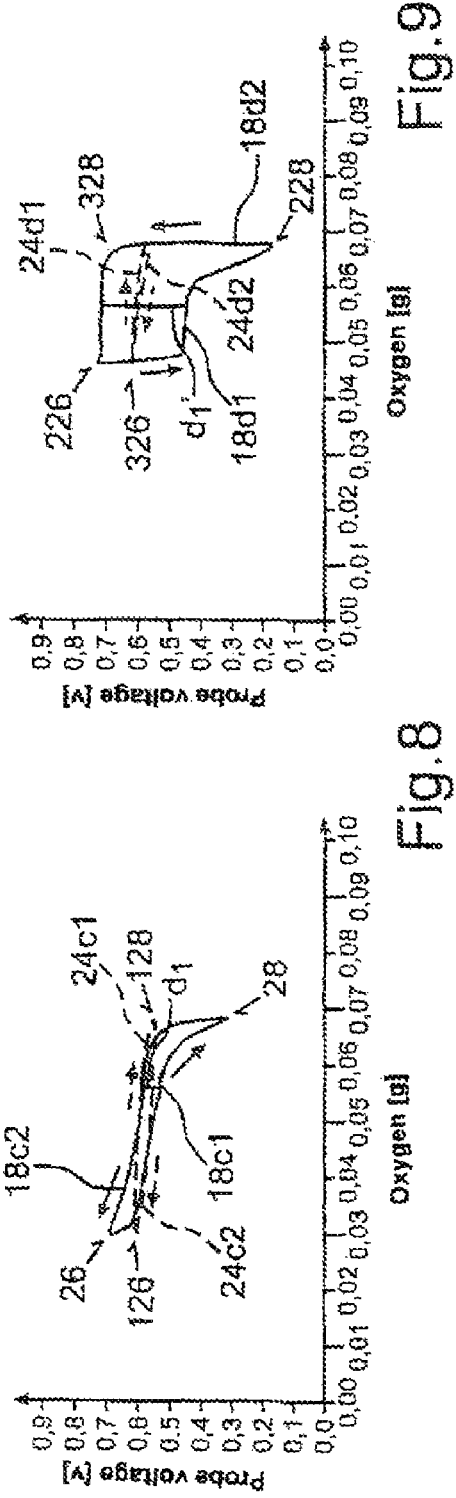

METHOD FOR CHECKING A CATALYTIC CONVERTER OXYGEN STORAGE RESERVOIR FOR SUFFICIENT STORAGE CAPACITY

The invention relates to a method for checking an oxygen storage reservoir assigned to a catalytic converter in the exhaust gas line to an internal combustion engine, and the result of the check is to be whether the storage capacity of the oxygen storage reservoir is still sufficient so that the overall system which is typically located in a motor vehicle meets legal requirements with respect to the composition of the exhaust gas.

BACKGROUND OF THE INVENTION

Thus it is also conventional, based on the composition of the exhaust gas, to deduce the storage capacity. For this purpose a lambda probe is provided which is located downstream from the oxygen storage reservoir, typically the entire catalytic converter, in the flow direction of the exhaust gas, or which is located in the oxygen storage reservoir and hence is located downstream from part of the oxygen storage reservoir. In this instance, the measured values of the lambda probe are the values of the voltage which is on the lambda probe. The storage capacity of the oxygen storage reservoir is reflected in the time behavior of the measured values when a change has taken place in the loading of the oxygen storage reservoir.

The oxygen storage reservoir does not work as long as it is supplied with exhaust gas with an air-fuel ratio of $\lambda=1$, since then the catalytic converter which has storage capacity by means of oxygen storage reservoir units causes all the fuel to be burned without oxygen residue. If the oxygen storage reservoir is supplied with rich exhaust gas, that is, with exhaust gas in which the proportion of fuel is higher, oxygen is removed from the oxygen storage reservoir. First of all, this is not dramatically reflected in the lambda probe located downstream from the oxygen storage reservoir, but there is a voltage jump as soon as the oxygen storage reservoir has been emptied, since then exhaust gas arrives at this lambda probe. It is the reverse when the oxygen storage reservoir is supplied with lean exhaust gas, that is, with exhaust gas in which the air-fuel ratio $\lambda$ is greater than 1, that is, there is more air than is required to react the fuel. Then atmospheric oxygen is removed and stored in the oxygen storage reservoir. Only when the oxygen storage reservoir is filled is there a jump in the measured values, because lean exhaust gas can not further release oxygen and arrives at the lambda probe.

At this point the situation is such that the oxygen storage reservoir can lose storage capacity especially due to ageing or poisoning with contaminants, but in the exact same way the lambda probe can also have undesirable behavior due to ageing or poisoning. It has been shown that the state in which the storage capacity of the oxygen storage reservoir is sufficient, but at the same time the lambda probe is not serviceable, can only be distinguished with difficulty from the state in which the storage capacity of the catalytic converter is not sufficient, with a fully serviceable lambda probe.

DE 10 2005 016 075 B4 describes a method for diagnosis of a lambda probe assigned to the exhaust gas catalytic converter of an internal combustion engine, in which the time delay in the jump of the signal of a lambda probe located upstream from the catalytic converter to the lambda probe located downstream from the exhaust gas catalytic converter is detected and specifically for two different mass flows of exhaust gas. Then it is determined from the measured time delays how large the catalytic converter-dictated proportion which is dependent on the exhaust gas mass flow is in the time delays and how large the probe-dictated proportion which is essentially independent of the exhaust gas mass flow is in the time delays. Only the probe-dictated proportion is used as the diagnosis criterion for the lambda probe.

In a refinement of the method described in DE 10 2005 016 075 B4, in DE 10 2008 023 893 which was published after the application date of this application, it is described that lean exhaust gas and rich exhaust gas are supplied to the catalytic converter in an alternating sequence into the exhaust gas line and a signal recorded when changing from lean to rich exhaust gas or vice versa from the lambda probe located downstream from the catalytic converter is used for diagnosis. This is based on the finding that the exhaust gas and its composition change slightly in such a change, even if the actual jump in the measured values of the lambda probe takes place only when after longer supply of rich exhaust gas the oxygen storage reservoir is emptied or after longer supply of lean exhaust gas the oxygen storage reservoir is completely filled.

The object of the invention is to show how four situations can be separated from one another by an analysis process, specifically that a) both the probe and also the oxygen storage reservoir are still operating well enough, b) that neither the probe and oxygen storage reservoir are well enough, or that c) the probe is working well enough, the oxygen storage reservoir, however, no longer has sufficient oxygen storage capacity, or that d) the oxygen storage reservoir has sufficient storage capacity, the probe, however, is no longer working well enough.

SUMMARY OF THE INVENTION

The object is achieved by the method of the present invention. In the method, the oxygen storage reservoir is supplied in an alternating sequence with rich and lean exhaust gas in two passes. In the first pass the degree to which the oxygen storage reservoir is filled with oxygen is varied over a first range of values (i.e., changes between the two boundary values of the range and passes through the values located in between), and in the second pass the degree to which the oxygen storage reservoir is filled with oxygen is varied over a second range of values which is different from the first range of values. In both passes, measured values are recorded by means of a lambda probe located downstream from at least part of the oxygen storage reservoir. Based on these measured values, the serviceability of the lambda probe and the sufficiency or insufficiency of the storage capacity are deduced.

The invention is linked to existing methods to the extent that the oxygen storage reservoir is supplied in alternating sequence with rich and lean exhaust gas, but conversely it is based on the finding that by changing the modulation depth of the degree of oxygen filling additional information can be obtained so that by increasing the amount of information also an increased number of cases can be distinguished from one another, in particular the serviceability of the lambda probe and the sufficiency or insufficiency of the storage capacity can be determined independently of one another.

Typically, supply takes place such that the rich exhaust gas has a first air-fuel ratio over a predetermined time interval and the lean exhaust gas has a second air-fuel ratio over a time interval, the air-fuel ratios being chosen such that the time intervals are usually the same. In order to be able to vary the degree of oxygen filling over different ranges, the air-fuel ratio in itself can be changed. A mathematical assignment of the supply of rich and lean exhaust gas to the degree of oxygen filling is, however, facilitated when only the durations of the supply of rich and lean exhaust gas are different from one another at the predetermined air-fuel ratio between changes in supply in the first pass on the one hand and the second pass on the other.

Preferably, one range of values encompasses the other: If therefore the first range of values extends from a first to a second value for the degree of oxygen filling, and the second range of values extends from a third to a fourth value for the degree of oxygen filling, the first value should be larger than the second value and the third value should be smaller than the fourth value, the interval between the first and second value and between the third and fourth value being especially preferably the same in order to have a symmetrical change of the range of values on its two sides. The definition of the "first pass" and "second pass" is intended only to distinguish the passes in and of themselves from one another and not to establish a time sequence. In any embodiment it is not important for the execution of the invention whether modulation takes place first of all over a larger range of values and then over a smaller one, or vice versa.

In this connection, the measured values from that pass in which lower oxygen modulation has taken place are preferably used to deduce the serviceability of the lambda probe.

The measured values are preferably examined with respect to oxygen loading, for which from the supply of the oxygen storage reservoir over time the oxygen loading can be deduced and the measured values recorded in the assigned time characteristic are then assigned to the respective oxygen loading in a curve, optionally also discretely in tabular form. The characteristic difference in the curves traversed in this connection between a fully serviceable lambda probe and a lambda probe which is no longer fully serviceable due to ageing or poisoning and which delivers the measurement signal of the fully serviceable lambda probe filtered with a virtual lowpass filter and, in particular, time-delayed can be recognized by several criteria:

First of all, fully serviceable lambda probes differ from less fully serviceable lambda probes in the derivative of the measured values after oxygen loading at the inflection points of the curve, specifically when changing from a rich to a lean exhaust gas and also when changing from a lean to a rich exhaust gas. For example, using a threshold value criterion this derivative can be used to decide whether the lambda probe is considered to be fully serviceable or not.

The derivative passes through a major change in the region around the inflection point, that is, viewed in terms of time, in the time environment of the change, and the serviceability of the lambda probe can be deduced using this change. Thus the second derivative can be easily determined after oxygen loading, but a normal slope in the first derivative can also be determined, that is, a difference in the first derivative viewed from the inflection point to a second point which is, for example, spaced apart from the first point by a certain value of oxygen loading.

One difference in the curves recorded from a fully serviceable lambda probe on the one hand and a less fully serviceable lambda probe on the other for deep oxygen modulation also consists in the distance of the two curve branches: For one curve branch measured values are recorded when the oxygen loading is increased, for the other curve branch measured values are recorded when the oxygen loading is subsequently lowered again. These curve branches do not coincide with one another. The degree of noncoincidence allows the serviceability of the lambda probe to be deduced. There are several methods for how this degree of noncoincidence can be determined. For example, let the distance of the two curve branches be specified for a certain value of the oxygen loading which should be suitably chosen, for example, around ±10% of the modulation depth around the center point of oxygen loading between the two inflection points. In exactly the same way the area between the two curve branches can be determined. Both the indicated distance and also the area should be defined such that negative values are possible, that is to say, will be defined over the distance from one certain curve branch to the other curve branch: The curve branches approach one another specifically when the lambda probe ages and separate again from one another with further ageing. Both the indicated distance, that is, the indicated area, therefore pass through a value of zero and then travel into the negative region. It is a question of definition from when the lambda probe is no longer fully serviceable; this is therefore the threshold value which is assigned to the distance or the area, and when it is exceeded or not reached (depending on the formulation of the criterion) the lambda probe is considered to be no longer fully serviceable.

Analysis for serviceability of the lambda probe takes place preferably first. In the case in which analysis shows that based on the aforementioned predetermined criteria or other predetermined criteria the lambda probe is not fully serviceable, the lambda probe is replaced by a fully serviceable lambda probe before the second pass, that is, the pass with a smaller oxygen modulation which must then be in fact placed downstream in time.

When the oxygen storage reservoir is supplied with an alternating sequence of lean and rich exhaust gas for a lambda probe recognized as fully serviceable or a fully serviceable lambda probe which has been newly inserted, such that the oxygen loading is not unduly varied, for example, between a value of between 25% and 35% of the maximum oxygen loading on the one hand and a value of between 65% and 75% on the other, for example, between 30% and 70%, the sufficiency or insufficiency of the storage capacity can be deduced based on predetermined criteria. The indicated values of modulation can be compared to typical values for the first pass with lower oxygen modulation which is varied between a first value of between 5% and 15% and a second value of between 85% and 95% of the maximum oxygen loading, typically between 10% and 90%.

In a pass with smaller oxygen modulation in which a fully serviceable lambda probe is assumed, the traversed curves differ greatly when once again the measured values are plotted over the oxygen loading of the oxygen storage reservoir. But fundamentally here also derivatives of the measured values after oxygen loading for a predetermined criterion can be used, since in a comparison between an oxygen storage reservoir with high storage capacity to a storage with low storage capacity the curve characteristics differ dramatically from one another, here again the following criteria can be used: Here the distance of the curve branches can also be used again as a criterion, and when this distance falls below a predetermined boundary value the storage capacity can be regarded as insufficient. In exactly the same way the area enclosed by the curve branches can also be measured and when this area falls below a predetermined value (typically measured in V g) the oxygen storage reservoir can be regarded as no longer having a sufficient storage capacity.

BRIEF DESCRIPTION OF THE DRAWINGS

FIGS. 6 to 9 show representations which correspond to FIGS. 2 to 5 for less deep oxygen modulation.

DETAILED DESCRIPTION OF THE PREFERRED EMBODIMENT OF THE INVENTION

Figure 1:
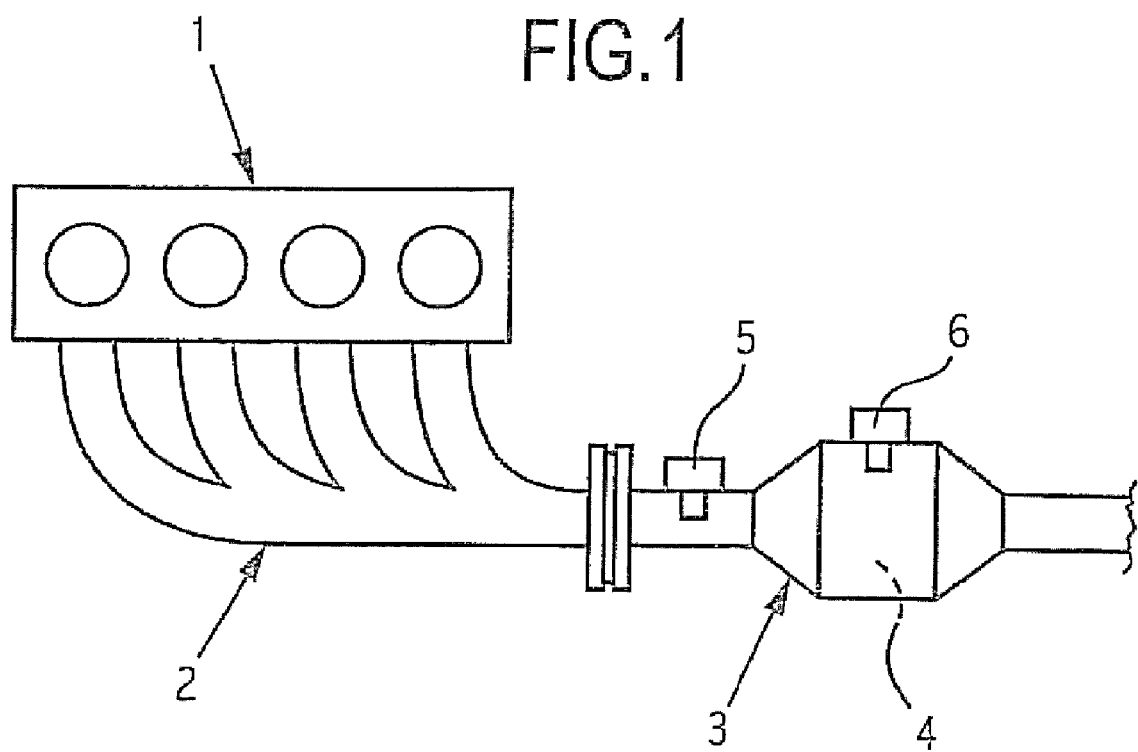
FIG. 1 shows an arrangement in which the method according to the invention is used, FIG. 2 schematically shows the air-fuel ratio for a relatively good oxygen storage reservoir as a function of the time for deep oxygen modulation for a lambda probe upstream from the oxygen storage reservoir on the one hand and a fully serviceable one and for a not fully serviceable lambda probe downstream from the oxygen storage reservoir on the other hand.

FIG. 1 shows a schematic of an internal combustion engine 1 with an exhaust gas line 2. The exhaust gas line 2 comprises an exhaust gas catalytic converter 3 which is made, for example, as a three-way catalytic converter, as a NOx storage catalytic converter, or as an active particle filter, and contains an integrated oxygen storage reservoir 4. The exhaust gas line 2 furthermore comprises a lambda probe 5 which is located upstream from die exhaust gas catalytic converter 3 and which is used as a guide probe, as well as a lambda probe 6 which is assigned to the exhaust gas catalytic converter 3 and which is used as a control probe.

The lambda probe 6 in this embodiment is located downstream from the exhaust gas catalytic converter 3. In exactly the same way this lambda probe could, however, also be located directly in the exhaust gas catalytic converter 3, i.e., downstream from a partial volume of the oxygen storage reservoir 4.

It is assumed below that the exhaust gas of the internal combustion engine can be set to a given air-fuel ratio λ at least with a given precision.

Figure 2:
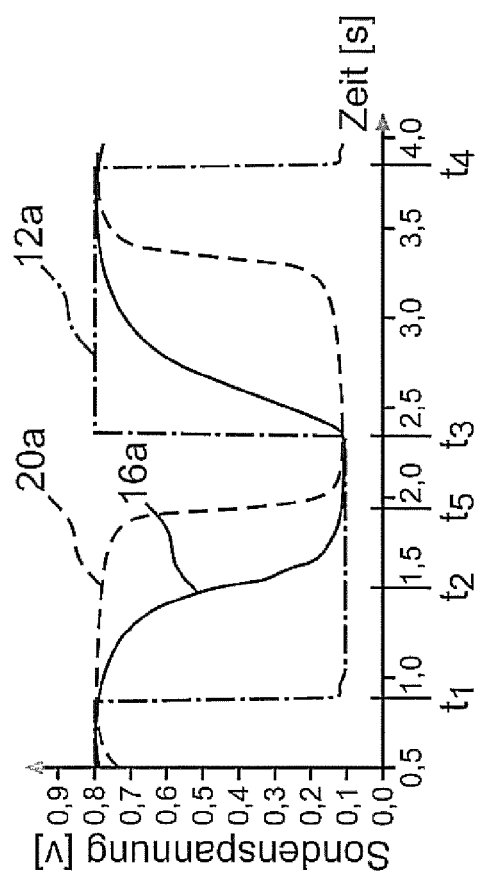
Figure 3:
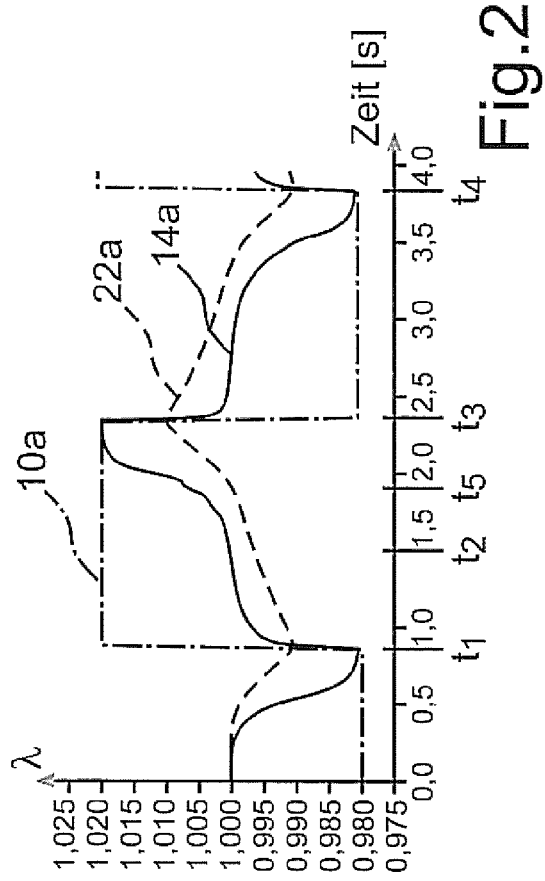
FIG. 3 shows a representation of the probe voltage which corresponds to the curves from FIG. 2 over time.

Here a lean exhaust gas mixture and a rich exhaust gas mixture are released in an alternating sequence. First of all let it be assumed that the individual phases of supply with lean or rich exhaust gas are each sufficiently long, so that the degree to which the oxygen storage reservoir 4 is filled with oxygen is passed through over a large region, specifically over almost the entire possible region. For this purpose the individual phases of supply with the lean or rich exhaust gas must be relatively long. FIG. 2 shows the behavior of the air-fuel ratio λ over time using curve 10a, as is present on the lambda probe 5. Using curve 12a, FIG. 3 shows which voltage in this connection is measured on this probe. The voltage of the probe changes between 0.1 and 0.8 V. At time $t_1$=0.8 s after longer supply with rich exhaust gas the oxygen storage reservoir is filled and rich exhaust gas arrives at the lambda probe 6. Therefore, the latter at time $t_1$ measures a voltage of 0.8 V. After instant $t_1$ lean exhaust gas is supplied. The curve 14a indicates how the air-fuel ratio λ appears on the lambda probe 6. The curve 14a indicates at the same time which air-fuel ratio is detected by a fully serviceable lambda probe 6. The curve 16a in FIG. 3 shows the measured values of the fully serviceable lambda probe 6 which occur in this connection. At time $t_2$ the curve 14a passes exactly through the value λ=1. This corresponds to a jump in the voltage recognizable by a boundary value of typically 0.45 V being exceeded in curve 16a. Up to time $t_3$ after relatively long supply of the oxygen storage reservoir with lean exhaust gas, the lean exhaust gas arrives at the fully serviceable lambda probe 6. Accordingly, the value of a voltage of 0.1 V is reached. The behavior is qualitatively exactly the reverse in subsequent supply with rich gas.

From curve 16a the behavior of the probe voltage on the fully serviceable lambda probe 6 can be computed depending on the oxygen loading of the oxygen storage reservoir 4. Since in the air-fuel ratio in supply in individual phases, for example, between $t_1$ and $t_3$, is constant, the oxygen loading changes constantly, specifically with x g/s. This can be computed from the exact value of the respective air-fuel ratio and thus from curve 16a the curve can be determined from curve branches 18a1 and 18a2. The curve branch 18a1 follows from the conversion of the behavior in the curve 16a between the instants $t_3$ and $t_4$.

Figure 4:
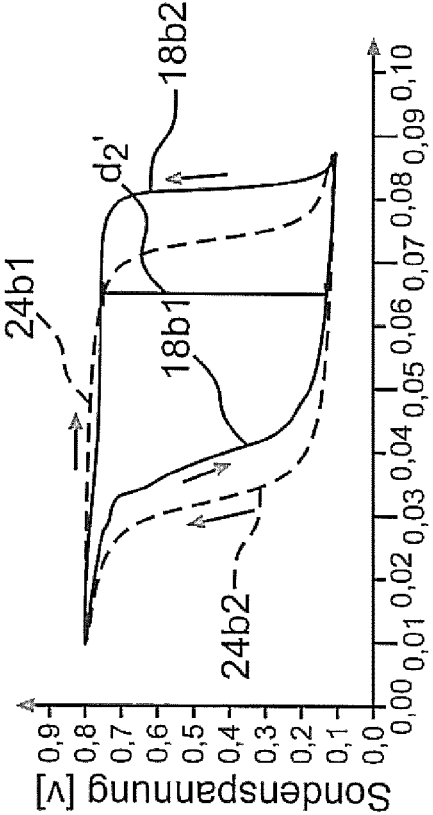
FIG. 4 shows a representation of the probe voltage which corresponds to FIG. 3 over the oxygen loading for a fully serviceable probe and one which is not fully serviceable.

FIG. 4 shows that there is hysteresis: For predetermined oxygen loading the probe voltage is dependent on whether the oxygen loading is increased or reduced.

FIGS. 2 to 4 now also illustrate how the probe signals behave for the same supply of the catalytic converter according to curve 10a and curve 12a, when the lambda probe 6 is not completely serviceable, specifically in particular, has aged. The probe voltage behaves according to curve 20a. These measured values dictate that the air-fuel ratio on the lambda probe 6 behaves according to curve 22a. Ageing of the probe causes the curve 16a to a certain extent to be subjected to a lowpass and to be time-offset so that curve 20a is obtained. In curve 22a this is expressed in that nothing at all is detected by the aged, thus not fully serviceable lambda probe 6, that the air-fuel ratio λ fluctuates between the values 0.980 and 1.020, but this air-fuel ratio seems to fluctuate only between values 0.990 and 1.010. Only at time $t_5$ which follows time $t_2$, is the point λ=1 traversed, that is, in the curve 20a a jump occurs only at time $t_5$.

The curve 20a can also be converted into a coordinate system in which the probe voltage is plotted over the oxygen loading. Then the curve 20a yields a curve with two curve branches 24a1 and 24a2.

Figure 5:
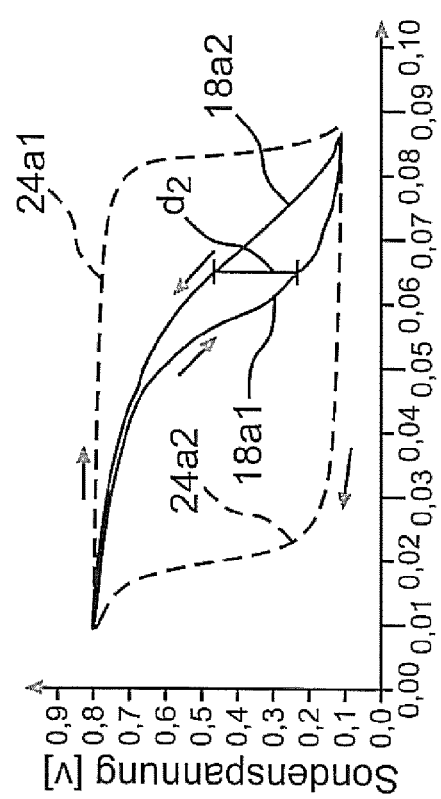
FIG. 5 shows a representation which corresponds to FIG. 4 when the oxygen storage reservoir is not good enough.

While in curves 2 to 4 it is assumed that the oxygen storage reservoir has high storage capacity, the curves corresponding to the curves from FIGS. 2 to 4 can also be determined for the case in which the oxygen storage reservoir has only low storage capacity. Under otherwise the same conditions, that is, when the oxygen storage reservoir 4 is supplied with exhaust gas according to curves 10a and 12a, a representation which corresponds to FIG. 4 can be derived in this way for an oxygen storage reservoir without fully adequate storage capacity, and this is FIG. 5. FIG. 5 shows two branches 18b1 and 18b2 which arise when the lambda probe 6 is fully serviceable. Two branches 24b1 and 24b2 are shown which arise when the lambda probe is not fully serviceable.

In a real case an observer does not know whether the oxygen storage reservoir has sufficient storage capacity or not, nor does he know whether the lambda probe is fully serviceable or not. In particular, in the case in which the lambda probe 6 is not fully serviceable, the curve branches 24a1 and 24b1 on the one hand and 24a2 and 24b2 on the other can hardly be distinguished from one another. There is a difference between the branches 18a1 and 18b1 and between the branches 18a2 and 18b2 and the ratio between branches 18a1 to 18a2 on the one hand and 18b1 to 18b2 on the other, but a criterion cannot be easily used to differentiate an oxygen storage reservoir with sufficient storage capacity from an oxygen storage reservoir with an inadequate oxygen storage capacity if it is not known whether the lambda probe used for determining the curves is fully serviceable or not. In particular, the curve branches 24a1 and 18b2 can possibly be confused with one another, therefore the cases are confused that the oxygen storage reservoir has sufficient storage capacity and the probe is not fully serviceable and that the oxygen storage reservoir does not have sufficient storage capacity and the probe is fully serviceable. But it is to be possible to make an unequivocal assessment.

For this purpose a second measurement is taken. In the second measurement the degree to which the oxygen storage reservoir 4 is filled with oxygen is varied over a smaller range than described above. In the past the degree of oxygen filling was varied by supplying the catalytic converter 3 with the oxygen storage reservoir 4 according to the curve 10a. The characteristic feature of curve 10a is that changing takes place between two states, specifically rich exhaust gas and lean exhaust gas are supplied in alternation. The air-fuel ratios in this connection are chosen such that the respective difference is equal to the value $\lambda=1$. The rich exhaust gas is supplied with an air-fuel ratio of $\lambda=0.980$, the difference from $\lambda=1$ is therefore 0.02. The lean exhaust gas is supplied with an air-fuel ratio of 1.020, the difference is therefore also 0.02 here. To cyclically run through oxygen loading, the respective air-fuel ratio can then be supplied for the respectively same time interval $\Delta t=t_3-t_1=t_4-t_3$. Other types of supply are possible in which the air-fuel ratio is spaced by different values apart from the value $\lambda=1$, and to equalize this, the duration of supply with lean and rich exhaust gas is made different.

Here there is reference to supply according to curve 10a. Changing between lean and rich exhaust gas occurs at the same values for the air-fuel ratio $\lambda$ according to curve 10c. Curve 10c differs from curve 10a only in the duration of supply with the respective air-fuel ratio, that is, either with $\lambda=1.02$ or with $\lambda=0.98$. The duration is the same as in curve 10a. In this way the oxygen loading is also cyclically run through here. The interval of values of the oxygen loading which is run through is, however, smaller than in the case of curve 10a.

FIGS. 6 and 7 show the curves from the curves corresponding to FIGS. 2 and 3, their designations being "c" instead of "a" for the same reference number. The curves designated as 14c and 16c for an oxygen storage reservoir 4 with sufficient storage capacity represent the measurement behavior of a fully serviceable lambda probe 6 and curves 20c and 22c the same for a lambda probe 6 which is not fully serviceable. According to FIG. 4 the curves 16c and 20c can be represented as a function of the oxygen loading and thus a curve is obtained with branches 18c1 and 18c2 for the fully serviceable probe and a curve with branches 24c1 and 24c2 for the probe which is not fully serviceable.

Furthermore, for the case in which the oxygen storage reservoir does not have sufficient oxygen storage capacity a representation according to FIG. 5 can be derived, and this is shown in FIG. 9. For the fully serviceable probe at low modulation of oxygen loading for an oxygen storage reservoir with sufficient storage capacity the curve branches 18d1 and 18d2 are shown, for a not fully serviceable lambda probe 6 according thereto, curve branches 24d1 and 24d2.

Since at this point it is to be ascertained both whether the oxygen storage reservoir 4 has sufficient storage capacity and whether the probe 6 is fully serviceable, checking for serviceability of the lambda probe 6 is begun here.

In this connection measurement curves are used which were obtained over a smaller interval when the oxygen loading of the oxygen storage reservoir 4 was varied. For the four possible cases these curves are shown in FIGS. 8 and 9. It can be recognized that the respective curve branches for the fully serviceable probe (designated as "18") differ from the respective curve branches for the not fully serviceable probe (designated as "24") regardless of the sufficiency of the storage capacity of the oxygen storage reservoir 4. The difference can be demonstrated using quantitative criteria.

Thus it is possible to study the behavior of the curves in the region of the inflection point at which the oxygen loading is maximally low. This inflection point between the curve branches 18c2 and 18c1 is designated as 26, accordingly, the inflection point between the curve branches 24c1 and 24c2 is designated as 126, the inflection point between quantities 18d1 and 18d2 is designated as 226, and the corresponding inflection point between curve branches 24d2 and 24d1 is designated as 326.

As can be seen, the slope of curves 18c1 and 18d1 is quantitatively much greater than the slope of curves 24c1 and 24d1. Therefore it can be recognized from the derivation of these curves whether the, lambda probe 6 is fully serviceable or not. For the derivation a threshold value can be determined, starting from below which the lambda probe is considered to be no longer serviceable.

Curves 18c1 and 18d1 show a conspicuous kink somewhat above the minimum oxygen loading. It can be quantitatively interpreted by either the second derivative being determined. The fact of the presence of the kink for a fully serviceable probe can also be detected by the difference being determined between the derivative at the inflection point 26, 126, 226, 326 on the one hand and the derivative at another point on the respective curves proceeding from this inflection point, this other point, for example, being chosen such that the oxygen loading is different from that at the inflection point 26, 126, 226, 326 by a predetermined amount. The point can also be chosen such that between 5% and 15% of the interval between that of minimum oxygen loading and of maximum oxygen loading has been traversed.

By analogy to the vicinity of the inflection points 26, 126, 226, 326 the ratios in the region of the opposite inflection points at which oxygen loading is maximum can also be determined. These inflection points are designated as 28, 128, 228 and 328 in FIGS. 8 and 9.

The difference between a fully serviceable probe and a probe which is not fully serviceable can also be determined based on the simple fact of hysteresis which is expressed in the presence of the respective curve branches, the extent of the hysteresis and its sign being able to play a part in this connection.

The extent of hysteresis can be determined by the distance between the two curve branches being determined for a predetermined oxygen loading. Here this distance will be defined such that at a predetermined oxygen loading, for example, at 0.055 g, the difference between the point on the curve for which the oxygen loading is reduced and the point on the curve for which the oxygen loading is increased, is computed. For oxygen loading of 0.055 g this distance is plotted as $d_1$ for the curve branches 18c2 and 18c1. When the probe ages, this distance is reduced, at some time the hysteresis reverses, i.e., the curve branch 24c2 lies underneath curve branch 24c1. According to the definition above then the distance is negative.

The distance which corresponds to the distance d1 from FIG. 8 is plotted as d1' in FIG. 9; it is specifically the distance between curves 18d2 and 18d1. For poor oxygen storage capacity this distance also decreases, passes through a value of zero and becomes negative.

A threshold value can now be chosen for the distance starting from which the probe is not longer fully serviceable. This threshold value must be below the threshold value of d1 so that a probe which is not fully serviceable at poor oxygen storage capacity is not inadvertently deduced for a good oxygen storage capacity and fully serviceable probe. The threshold value can be, for example, zero. It can therefore be checked whether the hysteresis is levorotary, as in a fully serviceable probe, or dextrorotary, as in a probe which is not fully serviceable.

In exactly the same manner as for a predetermined degree of oxygen loading a distance in the manner of $d_1$ and $d_1'$ can be determined, the area between the two curve branches can also be determined, and this area can be defined as the integral over the difference of the probe voltage as the oxygen loading is reduced and the probe voltage when the oxygen loading is raised. Then the integral for a fully serviceable probe is positive, decreases more and more and reaches negative values for a not fully serviceable probe. A suitable threshold value can also be established for the integral.

It is common to the aforementioned criteria that the measured values of the probe (probe voltage) must be assigned to the oxygen loading, here the entire curve being converted, for simplified methods, however, also tabular assignments can take place.

Since at this point for a minor variation of oxygen loading of the oxygen storage reservoir by supplying the catalytic converter 3 and the oxygen storage reservoir 4 according to curve 10c it has been determined whether the probe is fully serviceable or not, in the former case it is possible to immediately begin with checking for sufficiency or insufficiency of the storage capacity of the oxygen storage reservoir 4, and in the latter case the lambda probe 6 can be replaced by a fully serviceable probe. At this point supply of the catalytic converter 3 or of the oxygen storage reservoir 4 according to curve 10a can take place in a second pass or in the case of an a priori serviceable probe there can be reference to a pass before the first pass.

At this point it can be assumed that the lambda probe is fully serviceable, therefore only the curve branches designated with reference number "18" in FIGS. 4 and 6 are relevant. In order to decide whether the oxygen storage reservoir has sufficient storage capacity or not, the cases must be distinguished whether there are two curve branches in the manner of curve branches 18a1 and 18a2 or whether curve branches are measured in the manner of curve branches 18b1 and 18b2. A comparison of FIGS. 4 and 5 shows that the individual curve branches 18a1 and 18a2 separate more and more from one another until for insufficient storage capacity they have a large distance from one another, like curve branches 18b1 and 18b2. Thus here a distance d between the two curve branches can be measured for a predetermined oxygen loading of, e.g., 0.065 g. The distance is then d2 in the case of an adequate storage, for curve branches 18a2 and 18a1, i.e., approximately 0.2 V, and the distance is d2 for an inadequate oxygen storage reservoir, therefore over 0.6 V.

For this distance a threshold value can be defined above which the oxygen storage reservoir is no longer considered to be adequately serviceable.

Here the area enclosed by the respective curve branches 18a2 and 18a1 or 18b2 and 18b1 can also be alternatively used, and, when it exceeds the boundary value, the oxygen storage reservoir can be defined as no longer having sufficient storage capacity.

Both in the determination of the serviceability of a lambda probe and also in the determination of the sufficiency or insufficiency of the oxygen storage capacity, a distance determined or alternatively the area between the two curve branches was determined. The respective area can also be determined solely over a section of the curve branches, that between two predetermined values of oxygen loading.

The method according to the invention makes it possible to check in a motor vehicle whether the oxygen storage reservoir has sufficient storage capacity, and this is done using measured values of a lambda probe which is checked at the same time for its serviceability. Thus it can be ensured that the exhaust gas composition of the exhaust gas released from the motor vehicle meets legal requirements. If necessary the oxygen storage reservoir 4 is to be replaced.

The invention claimed is:

1. A method for checking the oxygen storage reservoir of a catalytic converter in the exhaust gas line of an internal combustion engine, for sufficient storage capacity, comprising:
   supplying in an alternating sequence with rich and lean exhaust gas in two passes, varying in a first pass the degree of oxygen filling of the storage reservoir over a first range of values, and varying in a second pass the degree of oxygen filling over a second range of values different from said first range of values;
   sensing the output of a lambda probe located downstream from at least a portion of said oxygen storage reservoir, during both of said passes; and
   deducing from said sensed outputs, the serviceability of said lambda probe and the sufficiency of the storage capacity of said oxygen storage reservoir.

2. The method of claim 1 including differing the durations of supplying of rich and lean exhaust gas at the air-fuel ratio which has been determined in each case between changes in the supply of said first and second passes.

3. The method of claim 1 wherein said first range of values for the degree of oxygen filling extends from first to second values, and said second range of values for the degree of oxygen filling extends from third to fourth values, and said first value in greater than said second value and said third value is less than said fourth value.

4. The method of claim 3 including deducing the serviceability of said lambda probe based on the sensed value from said first pass.

5. The method of claim 4 wherein said sensed values are assigned to the oxygen loading of said oxygen storage reservoir and the serviceability of the lambda probe is deduced from at least one of the derivative of the sensed values after oxygen loading when changing from at least one of a rich to a lean exhaust gas and at least one from a lean to a rich exhaust gas; at least one of a change in said derivative in the region around said change; at least one of the distance of a plot curve segment which leads from high oxygen loading to low oxygen loading, to a plot curve segment which leads from low oxygen loading to high oxygen loading, at a certain value of the oxygen loading; and
   at least one of the area between the curve branch which leads from a high oxygen loading, to the curve branch which leads from low oxygen loading to high oxygen loading, the serviceability of the lambda probe is deduced.

6. The method of claim 4 including replacing a nonfully serviceable lambda probe with a fully serviceable lambda probe before said second pass.

7. The method of claim 3 including deducing the sufficiency of the storage capacity of said oxygen storage reservoir on the basis of the sensed values of a fully serviceable lambda probe from said second pass.

8. The method of claim 7 including deducing the sufficiency of the storage capacity of said oxygen storage reservoir by assigning the sensed values from said second pass to the oxygen loading of said oxygen storage reservoir, and from at least one of the distance of the curve branch which leads from high oxygen leading to low oxygen loading to the curve branch which leads from low oxygen loading to high oxygen loading, at a certain value of the oxygen loading; and the area between the curve branch which leads from high oxygen loading to low oxygen loading, and the curve branch which leads from low oxygen loading to high oxygen loading.

* * * * *